J. G. LEWIS.
BLINDSTITCH SEWING MACHINE.
APPLICATION FILED DEC. 24, 1910.

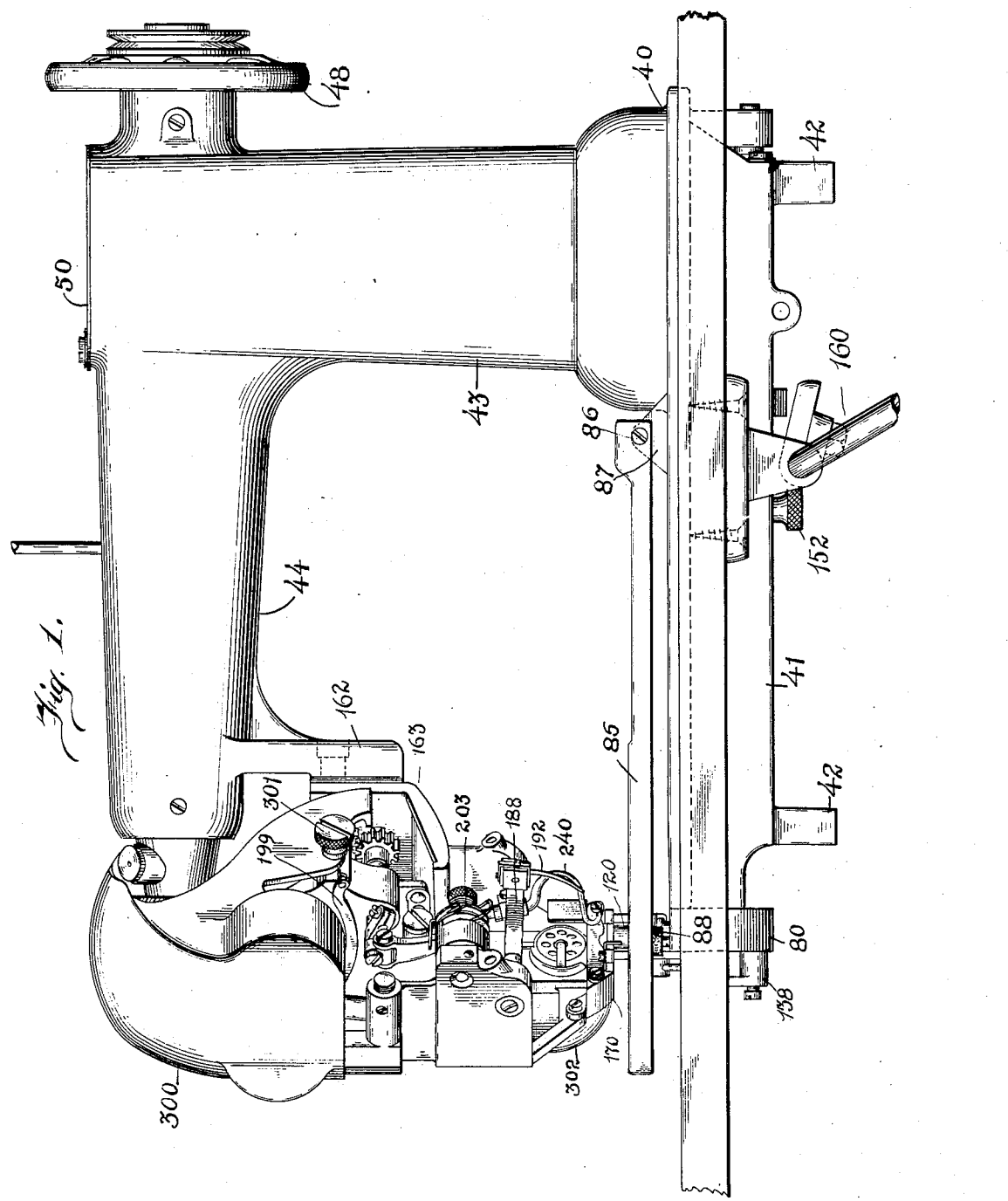

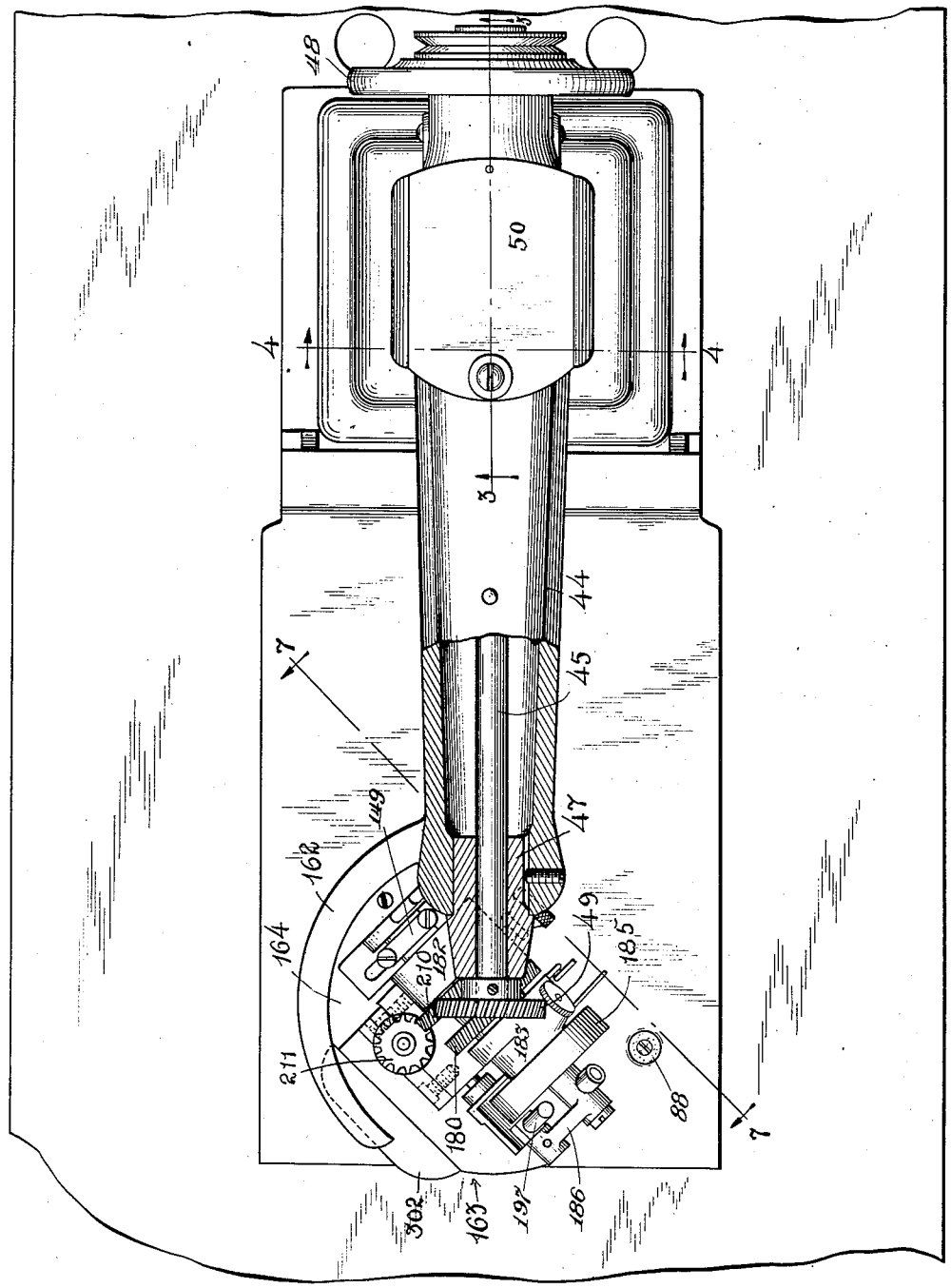

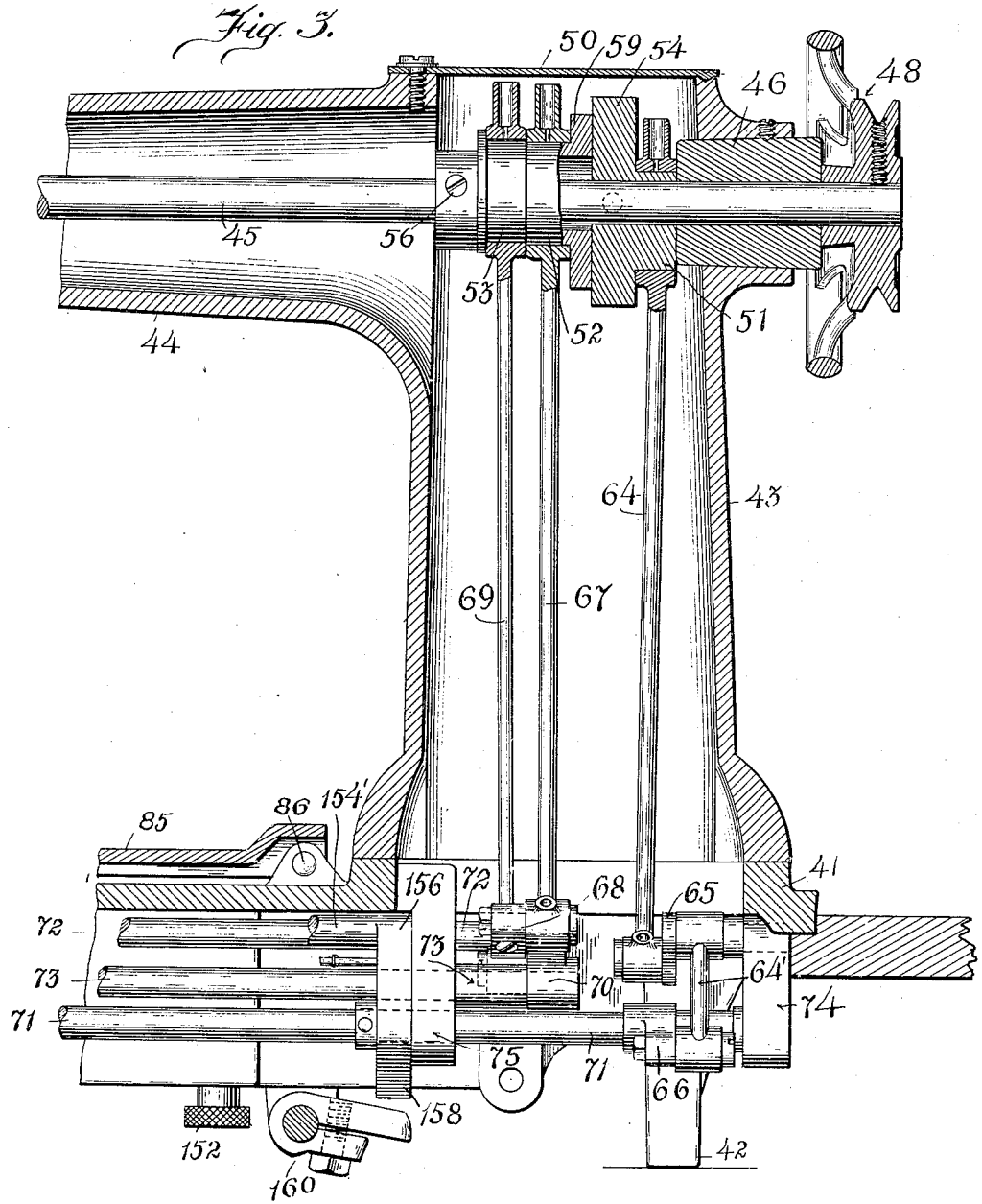

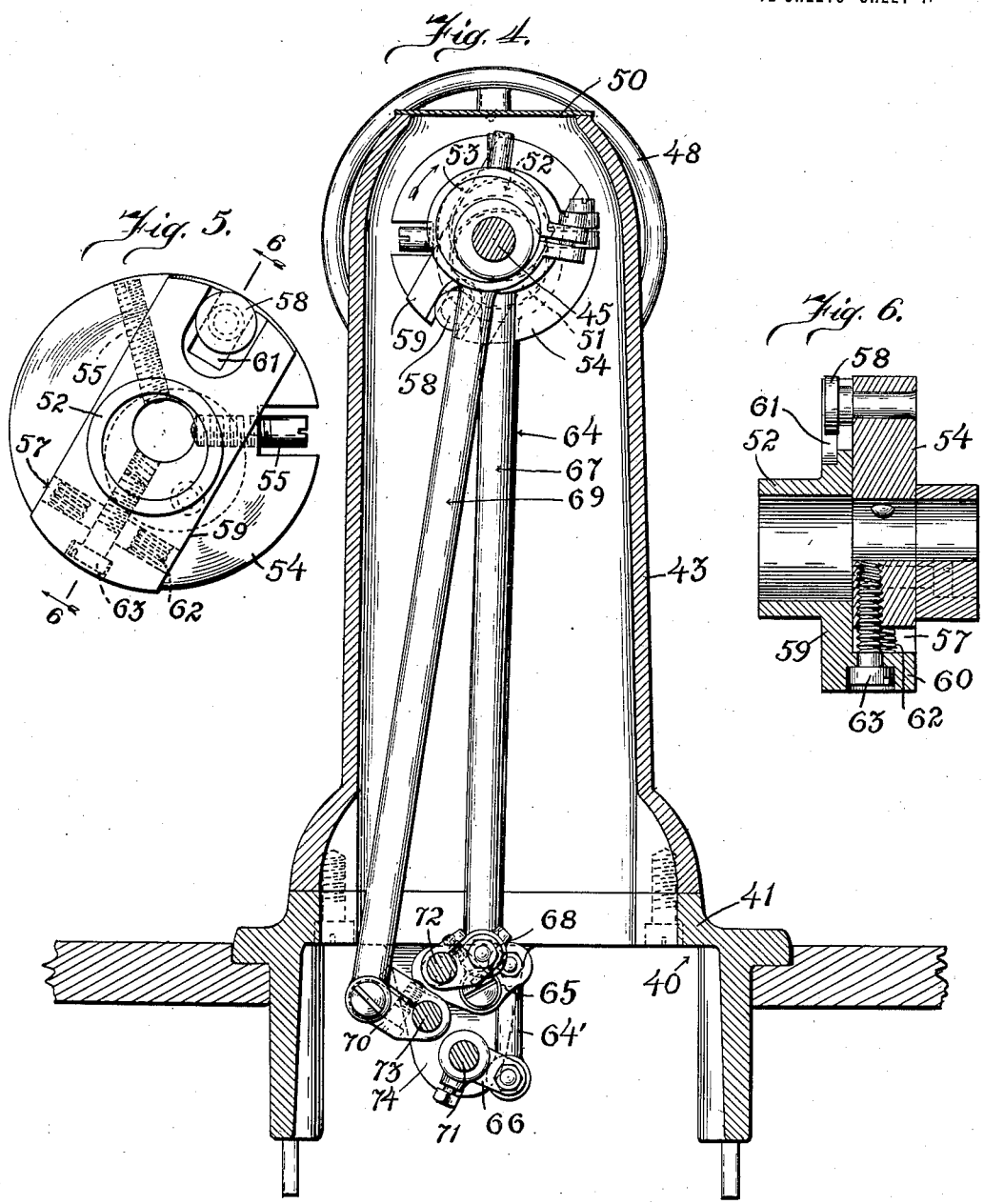

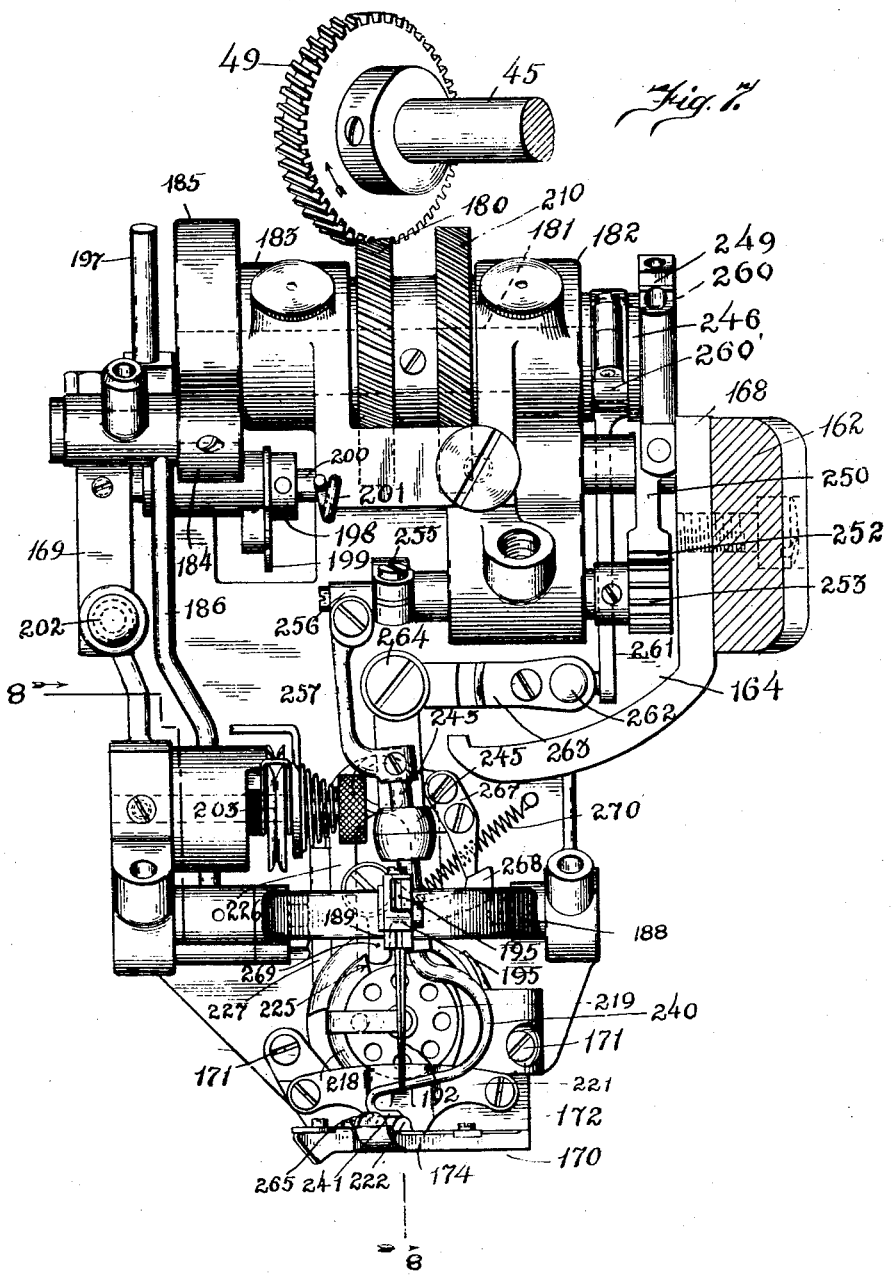

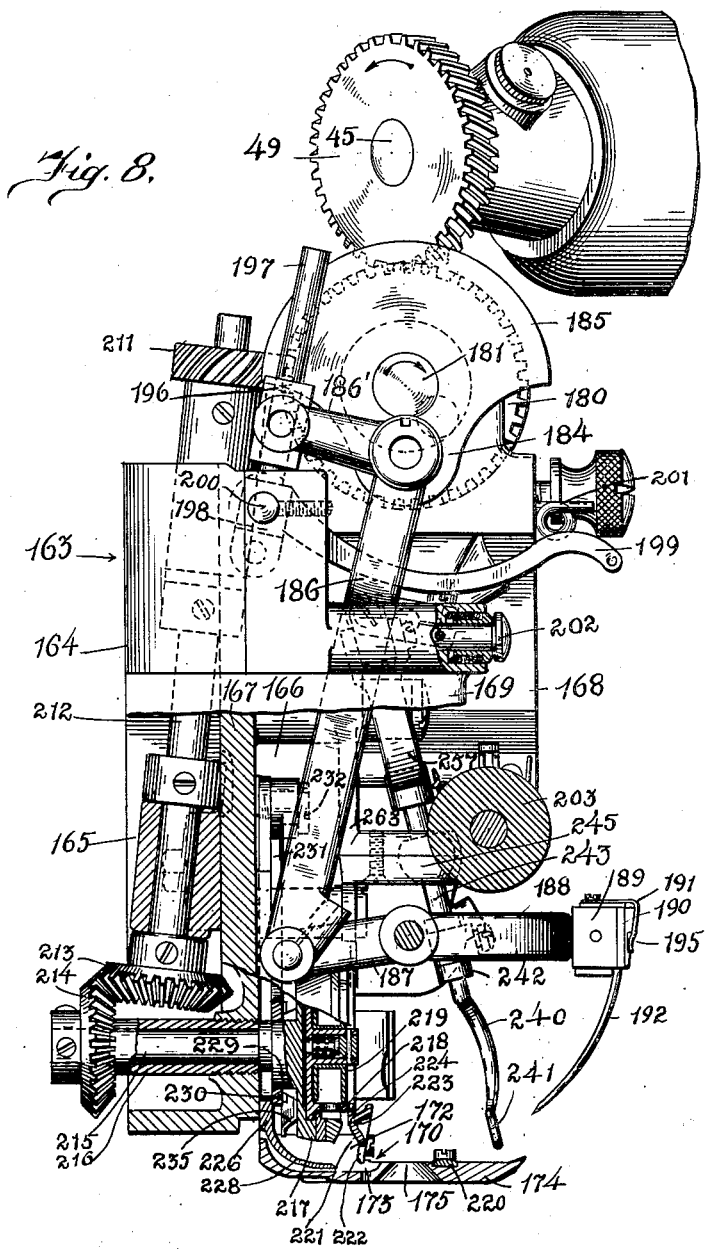

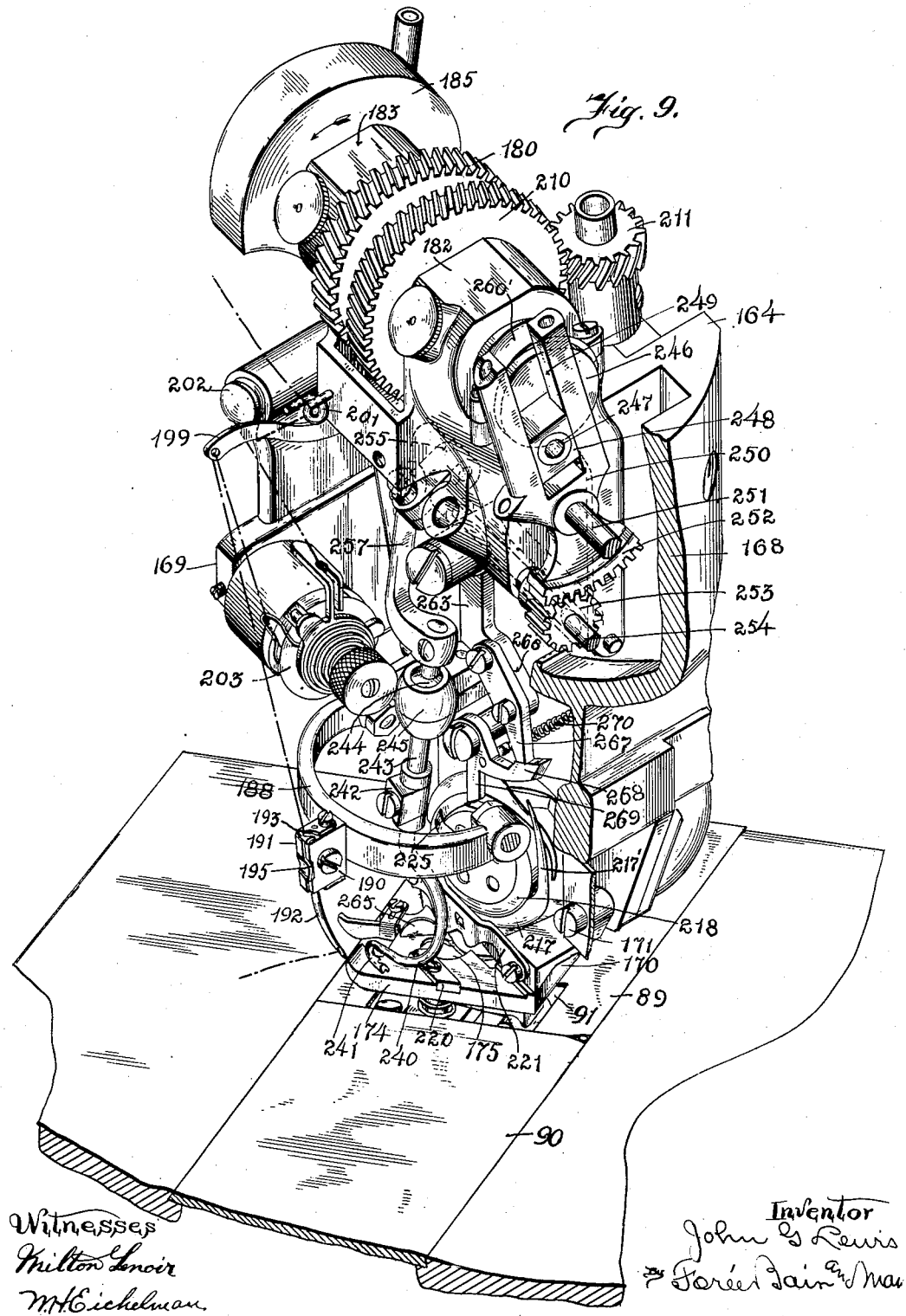

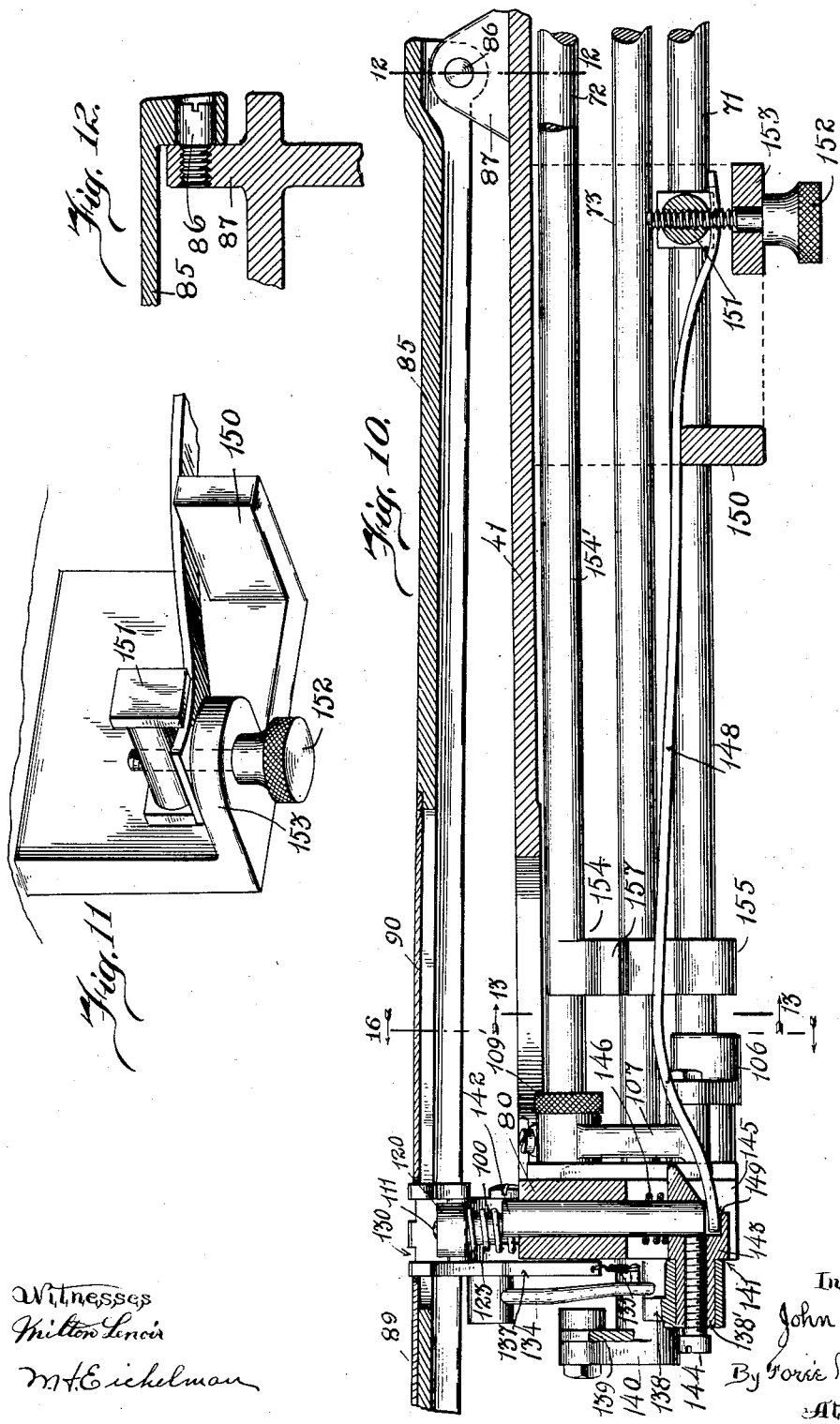

1,172,812.

Patented Feb. 22, 1916.
12 SHEETS—SHEET 9.

Witnesses
Milton Lenoir
M. F. Eichelman

Inventor
John G. Lewis
By Pierce Bain and May
Attorneys

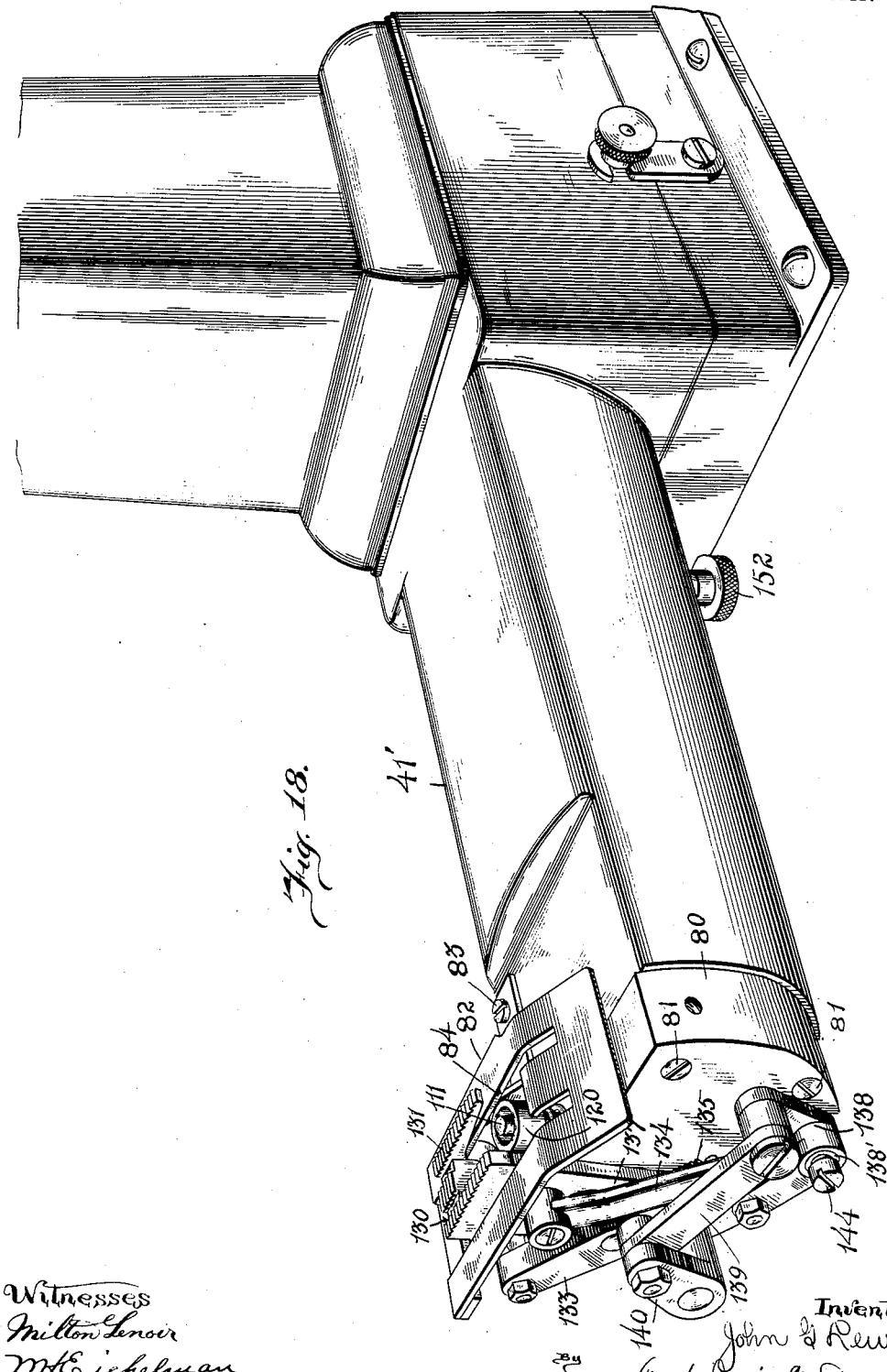

J. G. LEWIS.
BLINDSTITCH SEWING MACHINE.
APPLICATION FILED DEC. 24, 1910.

1,172,812.

Patented Feb. 22, 1916.
12 SHEETS—SHEET 11.

Witnesses
Milton Lenoir
M. H. Eichelman

Inventor
John G. Lewis
By Foree Bain & May
Attorneys.

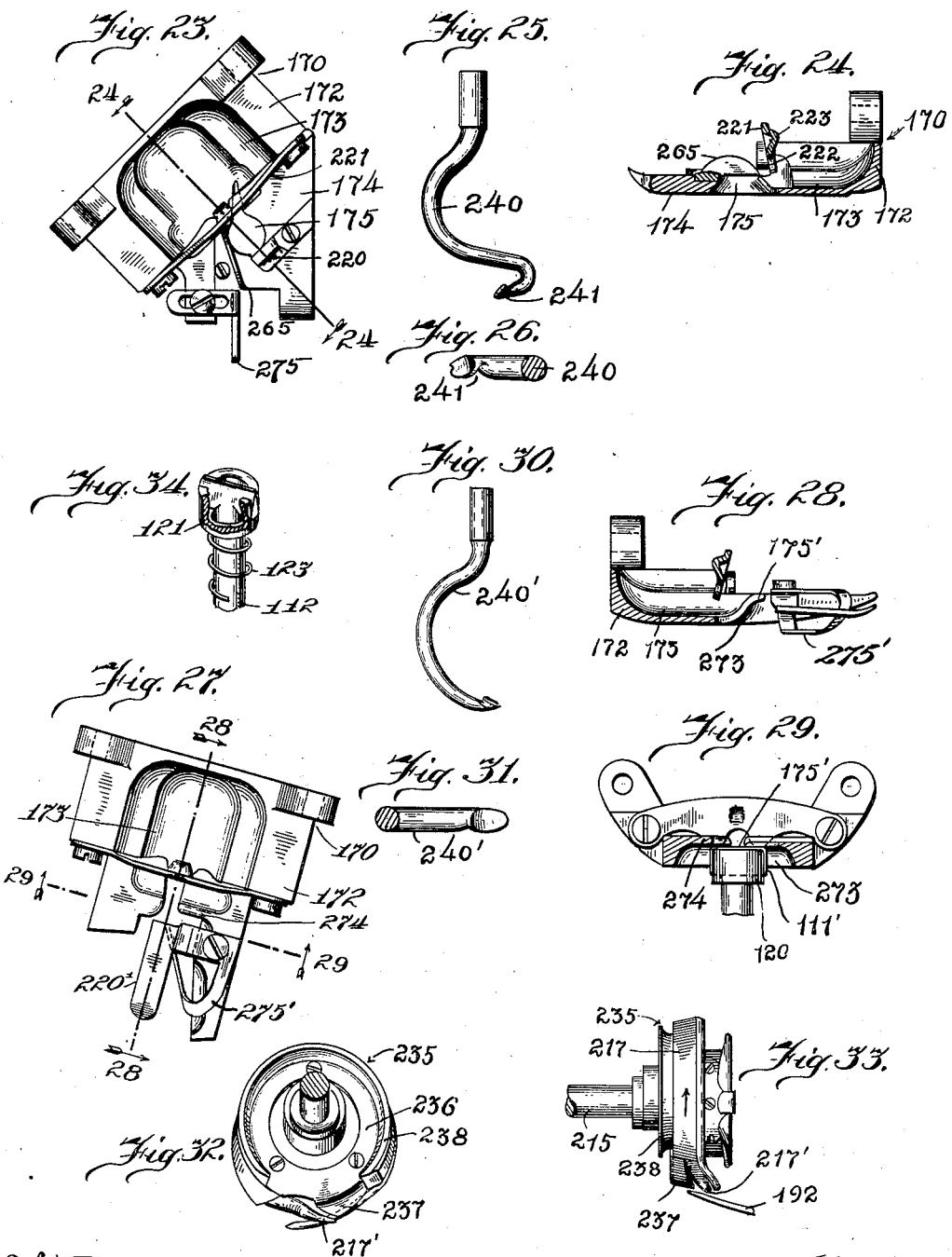

UNITED STATES PATENT OFFICE.

JOHN G. LEWIS, OF ST. LOUIS, MISSOURI.

BLINDSTITCH SEWING-MACHINE.

1,172,812.      Specification of Letters Patent.     Patented Feb. 22, 1916.

Application filed December 24, 1910. Serial No. 599,071.

*To all whom it may concern:*

Be it known that I, JOHN G. LEWIS, a citizen of the United States, residing at St. Louis, in the State of Missouri, have invented certain new and useful Improvements in Blindstitch Sewing-Machines, of which the following is a specification.

My invention relates to improvements in blind stitch sewing machines, and, in many features, it relates more particularly to sewing machines making a lock stitch.

Among the general objects of my invention I seek to provide a machine readily adapted to widely different sorts of work; capable of high speed and facile operation; suitable for handling materials of widely varying thickness and abruptly changing numbers of ply; and adaptable also to produce different characters of stitch for conformity with the requirements of different grades and sorts of work.

A more specific object of my invention is to provide a lock-stitch machine producing an over-seaming stitch with a single needle moving in a single path of reciprocation.

The many features of my invention productive of improved and novel mechanical organizations, and resulting in the performance of novel functions may best be ascertained from the appended claims in conjunction with the following specification and the accompanying drawings.

Figure 14:
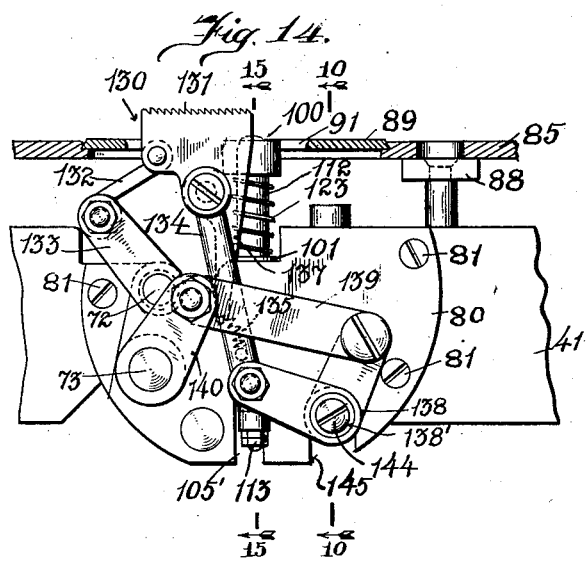
Figure 15:
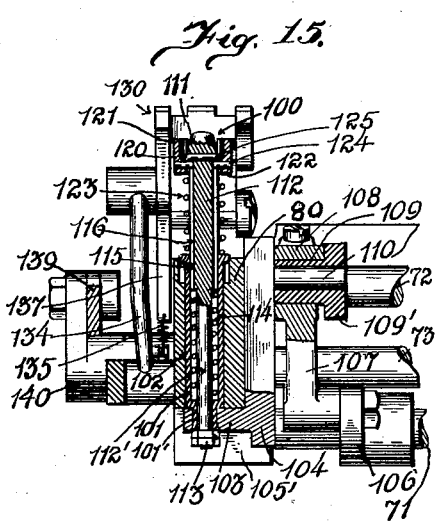
Figure 16:
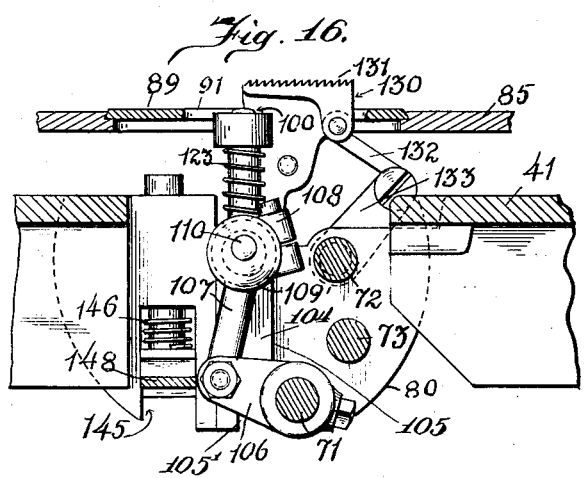
Figure 17:
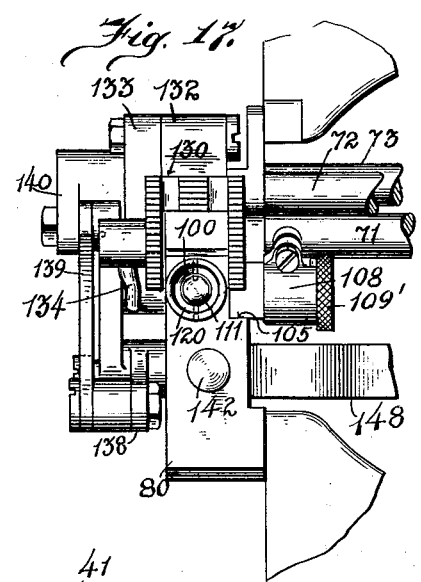
Figure 13:
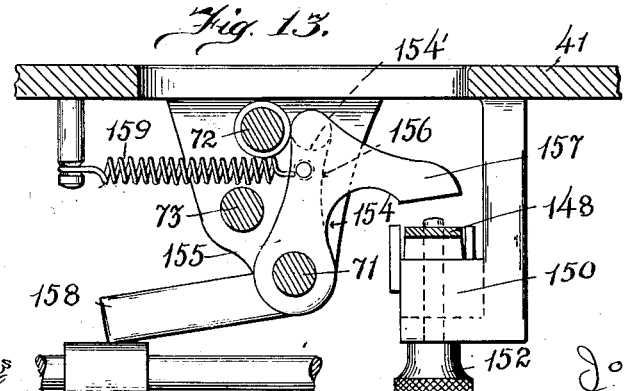
Figure 19:
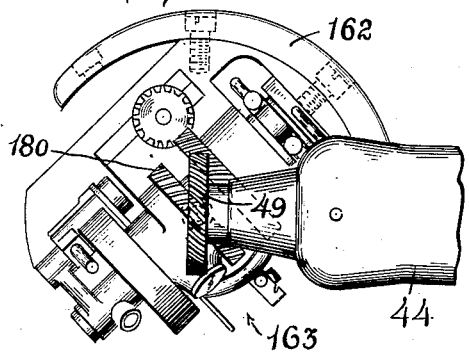
Figure 21:
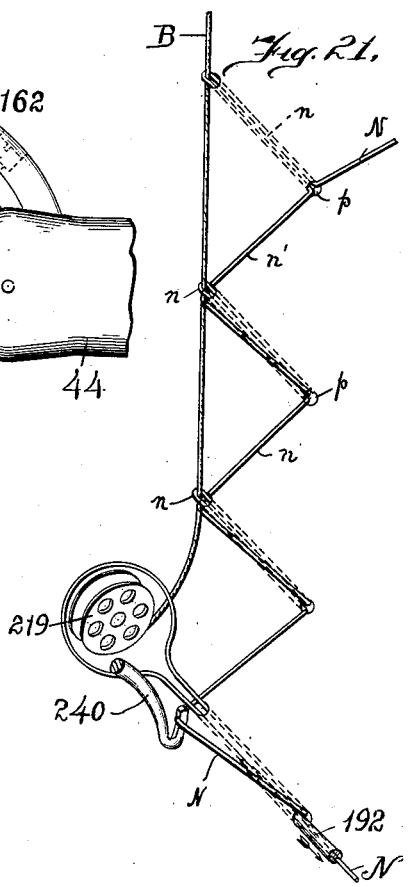
Figure 22:
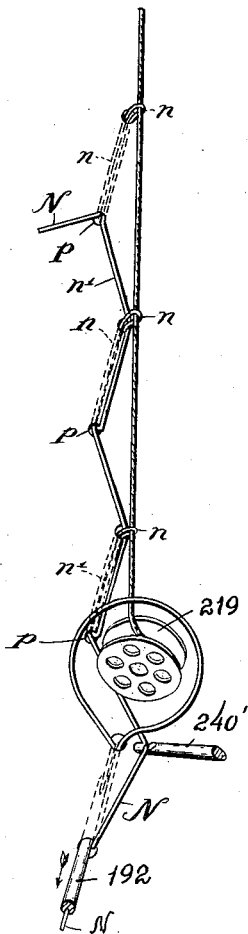
Figure 20:
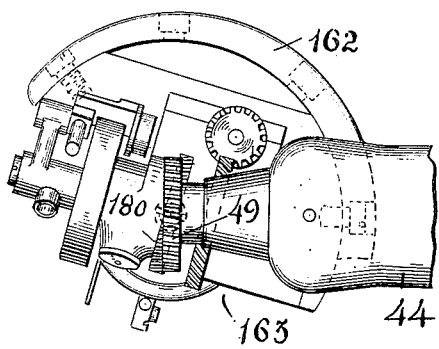

In such drawings, illustrative of a commercial embodiment of my invention, Figure 1 is a side elevation of a flat-bed machine; Fig. 2 is a plan view thereof with parts of the arm broken away; Fig. 3 is a vertical longitudinal section on line 3—3 of Fig. 2; Fig. 4 is a vertical transverse section on line 4—4 of Fig. 2; Fig. 5 is a detail elevation of an eccentric structure; Fig. 6 is a transverse section thereof on line 6—6 of Fig. 5; Fig. 7 is a section on line 7—7 of Fig. 2, to show the head in face elevation; Fig. 8 is a section on line 8—8 of Fig. 7; Fig. 9 is a perspective view of the head mechanism; Fig. 10 is a longitudinal section through the base of a flat-bed machine; Fig. 11 is a perspective detail of a spring adjustment; Fig. 12 is a sectional detail on line 12—12 of Fig. 10; Fig. 13 is a sectional detail taken on line 13—13 of Fig. 10; Fig. 14 is an elevation of the work-handling mechanism, the view being taken from the outer end of the bed; Fig. 15 is a vertical section on line 15—15 of Fig. 14; Fig. 16 shows the same mechanism viewed from section line 16—16 of Fig. 10; Fig. 17 is a plan view of the mechanism; Fig. 18 is a perspective view of the cylinder and work-handling mechanism of a cylinder base machine; Fig. 19 is a detail showing the relation of the head to the arm, in a 45°-right machine; Fig. 20 is a similar view of a 15°-left machine; Figs. 21 and 22 show respectively in exaggerated fashion the overseam form of stitch produced by the 45°-right and 15°-left machine, respectively; Fig. 23 is a plan view and Fig. 24 a sectional detail of a 45°-right presser foot; Figs. 25 and 26 are details of a right-hand bight-looper, shown in the major view; Fig. 27 is a plan view of a presser foot appropriate to a 15°-left machine; Figs. 28 and 29 are sectional details on lines 28—28 and 29—29, respectively, of Fig. 27; Figs. 30 and 31 are details of a bight-looper appropriate to a 15°-left machine; Figs. 32 and 33 are details of a thread and needle guard applied to a rotary hook of a machine and Fig. 34 is a detail of a modified form of plunger with an appropriate clamp.

In the drawings, 40 indicates in general the frame of the machine, whereof 41 indicates a flat base, mounted on feet 42; 43 is a frame post; and 44 the upper arm generally paralleling the base, the base and post being preferably detachably connected in customary fashion. The base has associated therewith the material-handling mechanism; the upper arm carries the drive shaft and a head bearing the presser foot and stitch-forming mechanism; and the post houses the operative connections between the drive shaft and the shafts for the work-handling parts on the base.

45 indicates the main drive shaft extending lengthwise through arm 44, journaled in detachable rear and front bearing bushings, 46 and 47, in the ends of said arm, said shaft carrying in its protruding rear end the hand-wheel-pulley 48, and at its front end a gear wheel 49 to drive the head shaft to be described.

Above the post 43, shaft 45 carries the cams for driving the rock shafts of the work-handling mechanism, said cams being accessible through an opening above the post, covered by plate 50. Said cams are three in number, termed respectively the plunger cam 51, lateral feed cam 52, and vertical feed cam 53, each said cam being in the form of an eccentric. Cams 51 and 53 are fixed upon the shaft, but the intermediate cam 52, for imparting lateral motion to a 4-way feed is adjustable to vary its eccentric throw, thereby to vary the stitch length. As a simple means to this end, cam 51 is integral with a block 54. Said block 54 provides in diametrical alinement a recess 57 in its edge, and a headed guide pin 58 on its face. The cam 52 has a large center opening (see Fig. 6) to accommodate its movement relative to the shaft, and is mounted on a plate 59, which has an offset end lug, 60, guided in the recess 57, and a countersunk guide slot 61, coöperating with guide pin 58. Coil springs 62 between the bottom of recess 57 and lug 60 of the plate press the plate outwardly against an adjusting screw, 63, passing through lug 60 and into the block 54, so that by adjustment of the screw 63, the degree of eccentricity of cam 52 is determined.

The eccentrics 51, 52, and 53, respectively drive rock shafts 71, 72, and 73, which I will respectively term the plunger shaft, lateral feed shaft, and vertical feed shaft. The strap of eccentric 51 is part of an arm 64, connected with the mid portion of lever 65 which is pivoted near its one end to a depending lug 74 of the frame and is connected at its other end by link 64' to the wrist pin of crank 66 on the plunger shaft 71. The strap of eccentric 52 is part of arm 67, which is connected to the wrist pin of crank 68 upon the lateral feed shaft 72. Similarly, arm 69 connects the strap of eccentric 53 to the wrist pin of crank 70 of vertical feed shaft 73. The rear end of shaft 71 finds bearing in lug 74, and shafts 72 and 73 project beyond their rear bearing in a frame lug 75.

Each of the shafts 71, 72, and 73 is straight and continuous, and the axis of each is a constant line. At their front ends said shafts all bear in a block 80, which is preferably in the form of a major segment of a cylinder, attached to the base by screws 81. The arrangement shown is advantageous in that it brings all of the longitudinal shafts of the base into an area of small compass, so that, if desired, said shafts may be readily inclosed within a base cylinder or arm 41' of relatively small size, as shown in Fig. 18, the block 80 conforming to the end of said cylinder. In this way, the machine may be set up to work on sleeves, trousers bottoms, and the like, with only a change of the base casting and its work-receiving connections.

Where the cylinder is employed, I generally provide a sheet metal bed plate 82, attached to the base cylinder by screws 83, and suitably disposed to present the work to the moving work-handling part which works through an opening 84 in said plate. The moving feed parts at the ends of the cylinder may be covered by a suitable housing (not shown) of any convenient shape. Where the flat bed is used, as shown in the major views, I provide a flat bed plate or work plate 85, pivoted as at 86 to ears 87 on the frame at its rear end, and at its front end bearing on an adjustable fiber-headed stop screw 88 projecting from the base 40. Such adjustable work plate surrounds the work-handling devices, and supports the garment being sewed, the plate having, of course, an opening through which the feed devices may work. Specifically, I prefer to provide in the plate two slides 89 and 90 which may be moved to give access to the working parts of the work-handling mechanism, having made therein an opening 91 of sufficient size for intended purpose.

The work-handling devices comprise in general a plunger reciprocable to present the stitch-receiving portion of the goods through an opening in a stationary presser foot which is above the work, a clamp carried by the plunger to operate upon the goods immediately around the stitch-receiving portion, and a 4-way feed device, these parts being operated by the three shafts 71, 72, and 73, through connections associated with the block 80. The plunger, generally indicated at 100, is a vertically reciprocating member, operated by shaft 71, provided with an appropriately shaped nose or tip to coöperate with the back of the goods. Specifically, 101 indicates a barrel portion of the plunger mounted to slide vertically in a guide opening 102 in the block 80, the bottom of said barrel being reduced in diameter into a throat 101', secured in an offset lug 103, projecting from a slide plate 104, which works in a slideway 105 in the inner face of the block 80, said slideway opening to a recess 105' across the bottom of the block to accommodate the movement of lug 103. To impart vertical motion to slide 104, shaft 71 is provided with a crank 106, having a wrist connection with link 107, the opposite extremity of which is pivotally connected to said slide 104: In order that the limits of the vertical movements of the slide 104 may be varied, and the limits of movement of the plunger be correspondingly changed, the connection between the slide 104 and link 107 is made adjustable. To this end, the upper extremity of link 107 is formed into a clamp, 108, engaging a rotarily adjustable sleeve 109, eccentrically apertured to surround the pin 110 projecting from slide 104.
Obviously, by rotating the eccentric sleeve 109, by means of its head 109', and clamping it in desired position, effective variations of the limits of throw of the plunger may be attained at will.

The tip or nose of the plunger is preferably yieldable relative to the body thereof to constitute a yielding back guide. To this end, the head 111 is mounted on a stem 112, extending into the central bore of the barrel 101, and reduced at its lower end, as at 112', to pass through the throat 101' to receive exterior stop nuts 113, the reduced portion 112' of the stem being surrounded by a coil spring 114 yieldingly extending the stem to its upper limit of movement relative to the barrel. A key 115 engaging a key way 116 in stem 112 prevents the head from rotating. The yieldability of the plunger thus provided is particularly advantageous in relieving the machine from strain under sudden increases in the thickness of work. Preferably, the connections of the plunger mechanism to the rock shaft 71 are such that in the rocking movement of the shaft, occuring with each revolution of the main shaft, the crank arm 90 swings past dead center slightly, so that the operation of the plunger is to rise from lowest to highest position, and then to dip or recede slightly before commencing its return to lowest position, thus securing what I will term a secondary retraction of the plunger head, of considerable duration and slight extent, occurring while the plunger is adjacent its upper limit of movement in its position of functional coöperation with the needle.

In operative association with the plunger I provide a clamping mechanism, for cooperation with the stationary presser foot above the cloth to clamp and steady the goods contiguous to the plunger at the time of needle penetration. Particularly the goods should be retained and clamped at that side of the plunger adjacent the point of entrance of the needle, in order that the goods may not give to the thrust of the needle and tend to follow the needle in its reciprocating movements. The precise configuration of the clamping means will, of course, be variable to correspond with such variation as may be made in the precise form of the plunger head, but in the specific construction shown, the clamp, 120, is a cup-shaped member, surrounding, or substantially surrounding, the head of the plunger, and yieldably mounted upon the plunger for reciprocation therewith.

121 indicates the rim of the clamp, the upper edge of which constitutes the clamping surface surrounding and spaced apart somewhat from the plunger head.

122 indicates the annular base of the clamp member surrounding the stem 112 of the plunger below its head. A spring 123 is interposed between the plunger barrel 101 and the clamp base, normally to maintain said clamp with its stop pin 124 abutting against the stop pin 125 of the plunger, so that obviously, the clamp may reciprocate with the plunger, but is capable of yielding movement to slide longitudinally or tilt universally relative to the plunger head.

The feeding of the goods is accomplished by a feed dog 130, operating against the under surface of the presser foot and driven laterally or fore-and-aft from lateral feed shaft 72 and vertically from the vertical feed shaft 73. The feed dog 130 is thus driven entirely by axially fixed, solid shafts, dispensing with universal joints, but the mounting and connections of the dog are such that it has a desirable and efficient capacity for adaptive movements. Thus, the dog is preferably swiveled on a horizontal axis capable of rocking motion to compensate for variations in thickness of material interposed between the presser foot and different fore-and-aft areas of the dog, thereby to enable all points on the toothed surfaces of the dog appropriately to coact with the work. Also said dog is preferably so mounted upon a carrier, spring-pressed to normal position, that any phase of its cyclic operation, and regardless of whether or not the drive shafts are in motion, the dog may be depressed to permit of the insertion, removal, or shifting of the work. To the latter end, I provide in the connection of the feed dog with the lateral feed shaft, a generally horizontal swinging link, and in the connection of said dog to the vertical feed shaft, I provide a lever system having a point of connection to the spring-pressed carrier and also having a generally horizontal swinging link, so that the dog may make excursions with the carrier permitted by swinging links.

The feed dog 130 provides suitable toothed areas or points, 131, two of which preferably flank the plunger and clamp mechanisms, while a third is in front of the plunger with reference to the direction of feed. To the forward extremity of the feed dog is pivoted a flat link, 132, arranged at a relatively small angle to the horizontal, and at its remote extremity pivoted to a crank 133 mounted upon the end of lateral feed shaft, 72. Near its fore-and-aft center, the feed dog is pivoted to the extremity of a generally vertical link 134, the normal, substantially horizontal, presentation of the point of the dog being maintained by a spring 135, between a pin 136 upon the lower end of said link and a pendant tail of dog 130.

The lower extremity of link 134 is pivoted to a horizontal arm of a bell crank lever 138, the vertical arm of which, upwardly extending, has connection by a substantially horizontal link, 139, with a crank lever 140, mounted upon the extremity of vertical feed shaft 73. Obviously, a rocking movement of lateral feed shaft 72 operates through crank 133 and link 132 to reciprocate the feed points laterally or fore-and-aft, and the rocking movements of vertical feed shaft 73 operate through connections 140—139, 138—134, to reciprocate the feed dog vertically. The pivot 138', upon which bell crank 138 rocks, is part of a carriage 141, comprising a guide post 142, sliding in a suitable opening in the block 80, and at its lower end connected to head 143 by a screw 144 extending through the pivot portion 138' of said head. The carriage head 143 works in a recess 145 in block 80, and upon said head I preferably mount a buffer spring 146 to ease the action of the carriage under high speed. The carriage is normally spring-pressed upwardly by a strong leaf spring 148, the tip of which engages in a recess 149, in the carriage head 143. The base of the spring 148 passes over a fulcrum lug, 150, suitably provided upon the base, and near its extremities is engaged by a block 151 adjustable to vary the tension of the spring by means of an adjusting screw 152, extending through the block and spring and through a fixed lug 153 of the frame. These parts are best shown in Figs. 10 and 11.

The spring 148 holds the carriage 141 in raised position, so that the 4-way movements of the feed may occur in proper relation to the goods to feed the same forward step by step, but it will be observed that the carriage may be depressed against the tension of the spring either incidentally to the functional operations of the feed or for the purpose of dropping the feed to permit the goods to be inserted, removed, or shifted. Obviously, when the carriage 141 is depressed, carrying with it the pivot member 138' for bell crank lever 138 of the feed system, the lowering of the bell crank lever draws down the link 134 and with it the feed points, the generally horizontal link 139 and the generally horizontal link 132 both swinging downward at their ends remote from the cranks 140 and 133 to accommodate the displacement of the feed points and the bell crank lever. Neither link 132 nor 139 need be in precisely horizontal position to accommodate this movement, but they should preferably be sufficiently near to horizontal to have the lateral displacement of their moving ends relatively small as compared with the vertical displacement. The arrangement shown is such that the depression of the carriage and the feed dog may take place regardless of the position of the cranks 133 and 140 in the cyclic operation of the feed.

Any appropriate means may be provided for depressing the carriage at will, the construction shown providing a rocking frame 154 arranged to act upon the spring 148 and a knee-lift for actuating said frame. Specifically, 155 and 156 indicate end arms of a frame, both pivoted upon the plunger shaft 71, and connected by frame bar 154' the first said arm having an extension 157 to act upon the spring 148 near its end, and the other arm having a lever extension, 158. A spring 159 normally holds the frame retracted to lift projection 157 away from the spring 148, but the elevation of the lever 158 by any suitable knee-operated device, 160, throws the rocking frame over to depress the spring 148 and with it the carriage 141.

It will, of course, be obvious that with the organization heretofore described, the plunger will be located at a point where the needle may coöperate therewith to penetrate the goods presented by the plunger, and I therefore refer to the vertical line including the axial line of the plunger as the "stitching axis." In different classes of work it is advantageous to have the needle axis at different appropriate angles to the path of feed, and also it is desirable in some instances to have the needle approach the stitching axis from the right side of the line of feed and sometimes from the left, according to the character of the work. One of the aims of my invention, is to provide a machine with its parts so organized that interchangeable parts may be used, as far as possible, in all machines, regardless of the degree of angularity of the needle relative to the path of feed, making the matter of the production of any desired type of machine practically one only of assemblage and adjustment. For these reasons, among others, I mount the entire stitch-forming mechanism in a head in such relation that rotary adjustment of the head about the stitching axis may be made with minimum change or readjustment of the head parts, and said head is associated with the frame arm in a fashion to permit its proper attachment to the arm in various positions of rotary adjustment. Specifically, 162 indicates an arcuate bearing extension of the frame arm 44, curving forward below the plane of the arm and having its inner surface in a true arc with the stitching axis of the machine as its center. The head of the machine, generally indicated at 163, carries the stitch-forming mechanism as an organized unit, and is built for attachment to the frame in different positions of angular adjustment. The head mechanism is mounted in a casting 164, having a sufficient portion of its exterior shaped to conform to the arc of bearing extension 162 for adequate contact therewith in various intended positions of angular adjustment. The casting provides a back recess 165 and a front recess 166, separated by a wall 167 which lies between side walls 168 and 169, termed for distinction the right and left walls. To describe specifically, the head construction of the machine shown in the major views (to wit, a 45°-right machine,—that is to say, a machine in which the needle path stands at 45° to the line of feed and the needle strikes from the right of the operator) 170, indicates in general the presser foot structure, detachably mounted upon the lower extremity of the head by screws 171, said structure comprising a body part 172, deeply recessed as at 173, to accommodate the hook and other mechanisms and having integrally connected therewith a toe plate 174 to overlie the feed mechanism. The plate 174 has a cloth opening 175, enlarged into a recess on the under surface of the plate, and into such recess and opening the plunger heretofore described works in the operation of the machine, while the clamp 120 works against the under side of the substantially rigid plate 174.

180 indicates a gear wheel, carried by shaft 181 and meshing with gear 49, carried by drive shaft 45. Shaft 181 is mounted in suitable right and left bearings, 182 and 183, of the head, and from it are driven all of the timed parts of the stitch-forming mechanism, comprising primarily, in the particular machine shown, a needle, a bight-looper, a needle thread take-up, a second thread-carrier, and a needle-elevating slide.

Shaft 181 bears at its left end, beyond bearing 183, a crank arm, 184, counterweighted as at 185, for balance of the moving parts, the wrist pin of said crank carrying a bell crank lever having a long vertical arm 186 and a short horizontal arm 186'. Said long arm 186 of the bell crank lever constitutes a link connection, pivotally attached at its lower end to a lever 187, forming an integral extension from one extremity of a needle bar 188 of arcuate or yoke shape, pivoted in suitable bearings on opposite sides of the head frame to oscillate on an axis substantially parallel with the head shaft 181. Centrally of its span the needle bar is provided with a head 189, equipped with a needle clamp 190, and a thread-guide and tensioner, 191, the clamp receiving the butt of a needle 192, which is of suitable curvature, side-pointed toward its outside arc, and angulated slightly to its arc of movement. The thread-guide and tensioner 191 is a small piece of spring metal (see Figs. 7 and 9) lying along the top and front face of head 189, providing a thread-receiving notch 193 to guide the thread into a groove 194 of the head 189, and providing also a spring wing 195, pressing into a shallow recess in head 189, intersecting said groove 194 to put a slight drag upon the thread. This form of thread-guide and tensioner I have found very effective in properly controlling the thread in the needle groove.

In general, the needle bar connections are such that with each rotation of the main shaft the needle is oscillated through nearly a quadrant of a circle.

The take-up for the needle thread is driven from the head shaft 181 through movements of the short bell crank arm 186' heretofore referred to. Said arm 186' has pivoted to its extremity a slide block 196, engaging a cylindrical arm 197, projecting from a rocking sleeve 198, carrying the take-up arm 199, and mounted for oscillation upon a short shaft 200, which finds suitable bearing in the head castings close to the back wall 167. The take-up arm projects forwardly beyond the sides of the head, and, of course, operates vertically. The thread-guiding arrangement is preferably such that the thread passes through an eye 201 below the take-up arm in the path of the take-up, to a suitable thread guide 202, of well known construction, thence to a suitable tension and thread controller spring at 203, up to the take-up arm and down to the needle-thread-guide 191, as indicated by dot-and-dash line in Fig. 9.

The arrangement described provides a very effective take-up, advantageously timed. Obviously, as crank arm 184 rotates in the direction of the arrow, (Fig. 8), it rocks the arm 197 rearwardly through the bell crank lever connection 186', during the period when the crank is crossing its lower vertical radius, and the slide block 196, is working upon the shortest radius of arm 197, so that the rise of the take-up 199 is sharp and rapid. The subsequent sliding of block 196 to the portion of arm 197 of longer radius, and the forward movement of said arm 197 with the slide block working on said longer radius, causes the downward movement of the take-up arm 199 to be relatively slow, practical dwells occurring at both ends of the excursion of the take-up.

In the machine shown, the needle co-acts with a rotary hook or loop-taker mechanism associated with its appropriate bobbin or second thread carrier. The head shaft is provided with a spiral gear 210, meshing with the pinion 211, carried by a vertically extending shaft 212, finding suitable bearings appurtenant to the rear wall 167 of the head casting, and extending downward to carry at its lower end a bevel gear 213, meshing with a corresponding gear 214 on the rear extremity of hook-shaft 215. The hook-shaft is mounted in an elongated sleeve 216, fixed in the wall 167, the shaft projecting through said wall to carry on the front side thereof the rotary hook or loop-taker 217 inclosing and coöperating with an appropriate bobbin case 218, inclosing the usual bobbin 219. Except for details hereinafter referred to, the hook, bobbin case, and bobbin construction are all of well known form and operation and need not be specifically described. In approaching the hook, the point of the needle first strikes the needle-deflector 220 removably secured upon the toe 174 of the presser foot, and the tensioned point, after it crosses the opening 175 passes through the needle throat 222 in the lower edge of a throat plate 221 at the front of the body portion 170 of the presser foot. The throat plate is provided with a protrusion 223, engaging a notch 224 in the edge of the bobbin case 218, and the bobbin case has on its upper edge a shoulder 225 to coöperate with a throw back part to be described. The hook member 217 has its rear surface inclined so that the pointed end of the needle blade, passing through the throat 222 may approach close thereto, and means are provided for bringing the needle close up to the hook to insure the taking of the loop by the beak of the hook. 226 is an elevating slide, lying flat against wall 167, and moving in guideways 227 thereon, said slide having a forwardly extending finger 228 arranged to receive the needle if the latter be deflected too far away from the periphery of the hook and to elevate the needle into operative relation to the hook beak, 217'. The slide 226 is vertically moved by an eccentric 229, preferably formed integral with the hook and engaged by an eccentric strap 230, which is extended into an arm 231, pivoted as at 232 to the upper extremity of slide 226, so that the timing of the reciprocations of the elevating slide are always in accord with the rotations of the hook.

On the rear face of the hook, I provide a device for preventing the needle from being lifted or deflected so high that the beak of the hook may pass under it and break the needle, said device also serving to prevent clogging of the hook shaft by accidental accumulation of thread. Specifically, 235 (Figs. 8, 32, and 33) indicates such guide part, consisting of an annular plate 236, attached to the back face of the hook, said annulus having a short arc of its edge deflected forwardly and at a suitable angle, as shown at 237, to lie immediately behind the beak of the hook, and said annulus having the major arc of its edge formed into an annular channel, 238, to receive loose thread-ends and waste material that might tend to clog the hook shaft, whereby said part 235 constitutes a thread guard on the back face of the hook.

In order that the machine may make an over-seaming stitch, involving both an overcast bight and a penetrant loop as joint parts of a single stitch made on each thrust of the needle, traveling in a single path of reciprocation, I provide what I may term a bight-looper or bight-taker mechanism, operating to take a bight of the needle thread from between the retracted needle and the point of anchorage of said needle thread in the work at the point of needle entrance of the previously completed stitch, and to overcast the bight above the work to encompass the point of needle emergence of the stitch being made, so that said overcast bight may partially encompass the next penetrant loop of needle thread at the point of emergence of the needle from the goods, and may be held or keyed by the bobbin thread when the latter interlocks with or keys the penetrant loop of needle thread. This I believe to be broadly new, viz: combining a stitch forming mechanism which is capable of forming a series of keyed penetrant loops, entering and emerging on the same side of the work so as themselves to constitute a series of complete blind stitches, with a bight-casting means or looper which may act on the same side of the work to cast a bight of the thread used in said penetrant loops from between two points where said thread enters the work, at the same ends of two successive penetrant loops, across the face of the work to such position that it may partially encompass the opposite end of the last made one of said penetrant loops so as to be retained by the keying arrangement of said penetrant loops. It will be obvious that the broad idea of so overcasting a bight of thread from one extreme of the penetrant range of the needle stroke appropriately to circumscribe the opposite extreme of the penetrant range of the needle stroke for the formation of a stitch as above described, might be embodied in machines differing in construction from that herein described, and that the present invention in its broader aspects is limited neither to the formation of such a bight as part of a lock stitch (as distinguished from a chain stitch) nor to the formation of such bight in the needle thread (as distinguished from a bobbin thread). Throughout this description I employ the term bight as a matter of convenient distinction to mean a bend or loop in the thread which does not penetrate the fabric, as distinguished from a penetrant loop.

Specifically, 240 indicates a bight-looper, providing a suitable thread-engaging end, 241, and mounted in a collar 242, secured in a looper bar 243, through which appropriate 6-way motion is communicated to the looper in order that it may cross the path of reciprocation of the needle between the goods and the needle during the retraction of the latter in order to engage the needle thread; move toward the hook in an upper plane to pass over the presser foot and the goods; descend into the recess 173 of the presser foot; and cross the path of the needle on about its line of travel, to position and release the bight; and rise and move outward again to complete its cycle. The looper bar is slidingly mounted in a ball 244, arranged in an appropriate two-piece socket 245, so that the bar may have universal freedom for pivotal movement and freedom for sliding movement relative to its said support. The desired 6-way movement is imparted to the looper bar from two mechanical motions deriving power from the head shaft, one motion raising and lowering and rocking fore-and-aft the looper bar relative to its ball-and-socket fulcrum, and the other motion giving lateral movement to the said ball and socket connections. Thus the head shaft, 181, carries on its right-hand extremity a plate 246, bearing a crank pin 247, on which is mounted a slide block 248, engaging a slideway 249 in a lever 250, which is pivoted on a horizontal shaft 251, and bears upon its lower end a gear sector 252. This sector meshes with a pinion 253 on a rock shaft 254, extending transversely through suitable bearings in the head casting to carry on its extremity a crank 255 having its wrist pin carrying a block 256, to which is pivoted on a fore-and-aft axis the arm 257 which at its lower end is secured to and carries the looper bar, 243. The head shaft 181 likewise carries an eccentric, 260, encircled by eccentric strap 260', from which depends arm 261, having a ball-and-socket connection 262 with the horizontal upper end of a bell crank lever 263 pivoted as at 264 and having its lower vertical arm directly connected to and carrying the socket 245 of the looper bar bearing. In a cycle of operations of these parts, starting from the position shown in Fig. 9, as the head shaft 181 rotates in an anti-clockwise direction, it operates through eccentric 260 to elevate arm 261, rocking bell crank lever 263, so that the looper point 241 moves laterally across the needle path on the thread-engaging portion of its cycle. This movement merges into an inward sweep accompanied by a lifting of the looper, as the crank 247, rocking the lever 250, occasions the latter, through its gear sector, to rock shaft 254, throwing crank 255 in an anti-clockwise direction over its vertical dead center. This movement of crank 255 and bar 257, tilts the looper bar 243 in its ball-and-socket joint to throw the point 241 of the looper toward the hook mechanism, and the movement is accomplished relatively rapidly as the crank 247 is working on lever 250 at the shortest radius of said lever. During the practical dwell in the movement of lever 250, while the slideblock 248 is slipping out to a longer radius, the eccentric 260 depresses the horizontal arm of the bell crank lever 263, causing the reverse lateral movement of the looper end, which throws its end across the path of the needle properly to dispose the bight to be entered by the needle. Obviously, the swing of the crank 247 across its upper vertical center, where it works upon the longer radius of the lever 250 causes a relatively slow return of the bight looper to initial position, and completes the cycle, the result of the various components of movements producing a travel of the looper end in an ovate course passing across the line of needle traverse at the inner and outer ends of its course and rising somewhat on the in and out movements between the ends of its course, the inward movement being considerably accelerated in order that the bight may properly be laid before the needle passes through the overcast bight as it emerges from the goods on its penetrating stroke, and the outward movement retarded so that the needle may properly be retracted and the take-up may effect its thread-drawing operation before the bight looper forms a new bight.

The bight looper is arranged to maintain its engagement with the bight of the needle thread until the needle has entered the bight, and then to cast off the bight before the looper makes its outward excursion. To insure the proper releasing of the thread from the looper, I provide a stripper, 265, upon the presser foot, to strip the thread from the looper as the latter passes the edge of the stripper in the course of its lateral traverse, or at the commencement of its outward excursion.

The bell crank lever 263 of the looper movement is also utilized to actuate the throw-back for the bobbin case, and to this end the lever is provided with an extension 266 bearing a shoe 267, which coöperates with the cam end 268 of a bell crank lever or throw-back part 269, the lower extremity of which forms a toe, engaging shoulder 225 of the bobbin case, as shown in Fig. 9. The lever 269 is normally retracted by a spring 270, but as the bell crank lever 263 has its vertical arm moved from left to right (Fig. 7), the shoe 267, working on cam surface 268, forces over the throw-back lever 269, and moves the bobbin case slightly in a direction opposed to the direction of rotation of the hook 217, thereby positively to open a thread clearance between the throat plate projection 221 and the edge of recess 224, which said projection engages.

In the operation of the sewing machine described, the goods are inserted in the machine when the needle is raised and the plunger lowered to the bottom of its stroke, where it is out of the way, the goods passage between the presser foot and feed mechanism being opened wide by rocking the knee lever 160, thereby tilting the frame, 154, so that its arm 155 depresses spring 148 and with it the carriage 141, which carries down with it, in the manner heretofore described, the feed dog. When the knee lever is released the spring 148 raises the feed to operative position and the machine is ready to commence operation. Each rotation of the main shaft of the machine causes the plunger 100 to rise, carrying with it the clamp 120, until said clamp is stopped by contact with the goods and clamps the goods contiguous to the plunger against the under surface of the presser foot toe, the plunger then continuing to rise to elevate the portion of the goods confined by the clamp to stitch-receiving position, presenting the goods to be stitched in the form of a hump or bend, which is taut over the surface of the plunger head 111. As the clamp begins to act the feed dog 130 descends, and when the plunger arrives at its highest position, the needle effects its penetrating stroke, passing into and out of the goods upon the face or stitching side thereof, to form a blind stitch. The needle point is tensioned by contact with the part 220, and passes through the throat in the throat plate 221, after its passage into and emergence from the goods, the proper relation of the needle to the rotary hook being insured by the operation of the elevating member 226, and the needle guard part 237. In well known manner, the hook takes the penetrant loop from the needle and passes it around the bobbin, the bobbin release 269 operating upon the bobbin case to open the thread clearance between the retaining projections 221 and the edge of recess 224 at the appropriate time. Upon the withdrawal of the needle, the plunger descends, carrying with it the clamp 120, and the forward feeding action then takes place.

As the needle stands in withdrawn position, the looper end 241 engages the thread between the retracted needle and the terminal point of anchorage of the last preceding stitch (which of course is the point at the surface of the goods where the needle penetrated on the preceding stitch) and said looper throws or overcasts a bight across the presser-foot cloth opening 175, so that on the next stroke of the needle said needle carrying the penetrant loop is passed up out of the work at the point of emergence of the needle, in a position partially encompassed by said overcast bight, the looper then being retracted so close to the stripper 265 as positively to cast its loop since the looper passes between parts 222 and 265 (see Fig. 24) and the stripper 265 lifts the chord of thread extending between the looper point and the point where the needle thread last entered the work, sufficiently to disengage the thread from the notch in the looper end 241. Thus, when the penetrant loop is keyed or interlocked with the bobbin thread, said overcast bight is retained by coaction of the penetrant loop and keying bobbin thread,—or by the bobbin thread alone, if the latter be drawn down into the goods. The specific stitch made by a 45°-right machine is exaggeratedly illustrated in Fig. 21, in which N indicates the needle thread and B the bobbin thread, points of penetration of the needle being indicated at $p$ and points of emergence thereof at $e$, the needle thread making a series of penetrant loops $n$ each keyed by the bobbin thread B, bights $n'$ of the needle thread being overcast from base points at two successive points of penetration $p$ to encircle the emergence points $e$ of the last made of said loops to be retained by the keying bobbin thread. Thus, the seam as ultimately made comprises a series of keyed penetrant loops connected by thread portions which are overcast each from between two base points at like extremes of successive penetrations, and each to form a bight with its crest encompassing the opposite extreme of the last made of the penetrations.

It will be obvious that if the looper is detached from the machine, the needle thread N will run straight along the line of penetration points $p$, eliminating merely the bights $n'$. Thus, it will be apparent that the series of keyed penetrant loops contemplated is a series of stitches complete in themselves regardless of the overcast bights.

While I have herein described in detail the construction of parts employed in the machine where the needle strikes at an angle of 45° to the line of feed, and from the right of the operator, one important feature of the construction is its adaptability to strike at different angles to the line of feed from either side. As shown in Fig. 20, the head of the machine may be adjusted rotatively about the stitching axis in the arcuate arm 162, and secured in desired positions of adjustment. This necessitates for every material change of angle a compensating changing in the cutting of gears 49 and 180, and the presser foot may advantageously be adapted in precise configuration to the specific angle to be provided for, and since the looper should throw the bight in the needle thread in the same general direction as that of the lateral or angular component of the needle travel, a "left" machine should have its looper making its orbital movement in reverse direction to that of the looper for a "right" machine, and the shape of the looper should correspondingly be changed. Thus, in a 15°-left machine, I advantageously employ a presser foot of the construction shown in Figs. 27 and 28, and a looper shaped as illustrated at 240' in Figs. 30 and 31, and I time the eccentric 260 on the head shaft appropriately to have the looper make its bight-laying traverse of the needle path from left to right of the line of feed. Thus, by the changing and readjustment of an insignificant number of parts, the machine is adaptable to many different classes of work. The stitch produced by a 15°-left machine is illustrated in Fig. 22, the general arrangement being the same as that shown in Fig. 21, but the appearance and commercial availability of the stitch differing quite materially from that produced by a machine having a larger angle between the line of feed and the line of needle passage.

Another important feature susceptible of ready attainment in the employment of my machine touches its capacity for handling, without readjustment, material of widely variant thickness, where the stitches are desired to penetrate only to a given depth, as in "edge-stay" work on coats. Referring to the presser foot shown in Figs. 27 and 28, it will be observed that the presser foot may be constructed with a relatively large cloth recess 273, partially overlain by stops or front guide projections 274, separated by an aperture 175', for the passage of the needle. With this form of presser foot I sometimes employ a plunger having its head 111' extending laterally to form a bar at its extremities underlying the stop 274. With this arrangement, the face or stitching side of the goods cannot be raised by the plunger above a predetermined plane, the plunger tip yielding after it has brought the face of the work to such plane. Under such conditions, the needle reciprocating in a constant path (very accurately determined by the coaction of the needle with the needle deflector 220) cannot strike deeper into the goods than the setting of these parts of the machine will permit, so insuring that the stitching shall be confined to the desired plies or depth of the goods. Where the goods imposed upon the plunger are not thick enough to reach the front guide or stop, the natural limits of movement of the plunger, acting under such circumstances as a back guide, prevent the goods from being raised so far as to cause the stitch to show through to the fair side of the goods, and where no front guide or stop is used, the plunger raises the fair side of the goods to substantially uniform position under widely varying thicknesses of the work. It will be noted that after the plunger rises to its highest point it dips or bobs slightly, after the needle has started to penetrate the goods, so relieving from any grinding or abrading action that portion of the goods lying between the moving needle and the plunger, and subserving other useful functions incident to successful and high speed work.

A further advantageous feature of my machine is the capability of the feed mechanism to be depressed out of commission at any point in the cycle of operation and while the machine is running, thus permitting the operator to substitute manual control of the feeding of the goods for the automatic feed at any time when the exigencies of the work so require. For instance, sharp turns in the goods, to change the direction of the lines of the stitches, may be made and,—especially when the machine is being operated without the looper,—as for instance in tacking, padding collars, or the like,—the operator may sew forward and backward at will, allowing the forward feed to be effected by the automatic feed mechanism, and drawing the goods backward by hand. During such a manual feeding operation, the clamp 120 operates to clamp the goods during every penetration of the needle, so obviating the possibility of damaging the needle and also insuring proper tensioning of the goods on each such stitch. Obviously, the goods may be shifted or fed laterally while the feed dog is so held out of commission, and blind stitch tacking may be done rapidly and facilely.

With the different forms of presser foot, I employ suitably adapted guiding devices for the cloth. For instance, 275 is a common form of edge guide adjustably secured on the presser foot, as shown in the major views. 275' is a modified edge guide for a lining or other superposed layer, used on the 15°-left presser foot of Fig. 27, where the edge is to be very accurately guided for close work. Such guide acts below the member 220' of the presser foot (which serves as the needle deflector) and is of light spring construction to yield to the upward pressure of clamp, 120. The form of guide employed is, of course, governed by the character of the work to be done.

Obviously, such parts and mechanism as do not need to be under the immediate supervision of the operator may be housed course, governed by the character of the for the protection of the machine and of the operator, and in the drawings 300 represents the cap appropriately shaped to cover a large portion of the head mechanism secured in place by screws 301, and 302, indicates a cover secured to overlie the lower hook-shaft driving gear.

While I have herein described in considerable detail a particular embodiment of my invention which I have commercially used, and found to be highly desirable in many of its details, as well as in general combinations of elements, it will be understood by those skilled in the art that many changes in the specific embodiment might be made without departure from the spirit of my invention and within the scope of the appended claims.

What I claim is:

1. In a machine of the character described, stitch-forming mechanism comprising a needle and coacting means for forming a series of complete stitches comprising keyed penetrant loops, said needle entering and emerging from the same side of the work, in combination with means, working always on one side of the work, to take the thread between a completed stitch and the source of thread supply, and to throw a bight of the thread from beyond one extreme of the penetrant range of the needle to beyond the other extreme of such range.

2. In a machine of the character described, stitch-forming mechanism comprising a needle and coacting means, including a loop taker for the needle thread, for forming a series of keyed penetrant loops; in combination with a bight looper, and means for moving the same to take a bight of the needle thread from between a point of anchorage thereof in the work, and the source of thread supply, and cast the bight to encompass a succeeding point of emergence of the needle.

3. In a machine of the character described, stitch-forming mechanism comprising a needle and coacting means for forming a series of complete stitches comprising keyed penetrant loops, entering and emerging from the same side of the work, in combination with a bight looper and means for moving the same always on the same side of the work from one extreme of the penetration range of the needle to the other extreme, in the general direction of the needle path, and transversely across the needle path at the extremes of such looper movement, to take thread between a completed stitch and the source of thread supply and overcast a bight of such thread.

4. In a machine of the character described, stitch-forming mechanism comprising a needle arranged to enter and emerge from the same side of the work and coacting means for forming a series of complete stitches comprising keyed penetrant loops having opposite extremes of penetration on the same side of the work, in combination with a bight looper and means to move the same always on the same side of the work across the line of seam and up and down with respect to the surface of the work to take thread between a completed stitch and the source of thread supply and to overcast a bight of the thread lengthwise of the needle travel from one extreme of the needle penetration to encompass an opposite extreme of penetration.

5. In a machine of the character described, means to feed and present the work and stitch-forming mechanism, the latter comprising a needle and coacting means for forming a series of keyed penetrant loops, said needle entering and emerging from the same side of the work, in combination with a bight looper and means to move the active portion of said looper always on the same side of the work across the needle path to take a bight of the needle thread, lengthwise of said path to overcast said bight, and across said path again to lay said bight, the lines of said transverse movement of the looper lying beyond the extremes of the penetration range of the needle.

6. In a machine of the character described, stitch-forming mechanism; comprising a single needle and coacting means for forming a series of keyed penetrant loops; in combination with a bight looper and means for moving said bight looper to overcast a bight of the needle thread from between the needle and the work to beyond the remote extreme of needle penetration to position said bight to be entered by the succeeding penetrant loop of the needle thread.

7. In a machine of the character described, stitch-forming mechanism; comprising a needle and coacting means for forming a series of keyed penetrant loops; in combination with a bight looper for the needle thread and means to move the same in a 6-way path, across the needle path between the needle and the work, then over the work to beyond the range of needle penetration, across the needle path, and back to the commencement of its cycle.

8. In a machine of the character described, stitch-forming mechanism; comprising a needle, a loop taker, and a second thread carrier, coöperating to form a series of lock stitches, said needle entering and emerging from the same side of the work; in combination with a bight looper, and means to move the same always on the same side of the work to overcast a bight of one of the threads from one extremity of the penetration range of the needle to beyond the opposite extremity of said range.

9. In a machine of the character described, stitch-forming mechanism; comprising a needle, a loop taker, and a second thread carrier, coöperating to form a series of blind lock stitches; in combination with a bight looper and means to move the same to overcast a bight of the needle thread from one extremity of the penetrant range of the needle to beyond the opposite extremity of said range.

10. In a machine of the character described, stitch-forming mechanism; comprising a needle, a loop taker, and a second thread carrier, coöperating to form a series of blind lock stitches; in combination with a bight looper and means to move the same always on one side of the work to overcast a bight of needle thread from its anchorage point in a completed stitch to beyond and encompassing the point of needle emergence of a stitch to be formed, thereby to position the bight of said needle thread to be entered by the penetrant loop of the same thread.

11. In a blind stitch sewing machine, stitch-forming mechanism comprising a needle, a loop taker for the needle thread, and a second-thread carrier arranged for coöperation to form a series of penetrant loops of the needle thread keyed by the second thread, in combination with a bight looper and means to impart six-way movement to said bight looper to overcast a bight of the needle thread from its point of anchorage in each completed stitch to encompass the point of needle emergence of the next succeeding stitch.

12. In a blind stitch sewing machine, the combination of a presser foot having a cloth opening therein, a needle, means for moving said needle to enter and emerge from the work on the same side of the presser foot, and adjacent opposite sides of the cloth opening, means coöperating with said needle to form a series of keyed penetrant loops, a bight looper on the same side of the presser foot as the needle, and means for moving said bight looper to cast a bight of the needle thread across the cloth opening to be entered by the needle as the latter emerges from the work.

13. In a machine of the character described, the combination of a presser foot having a cloth opening therein, means to present cloth to said opening, a needle, means for moving said needle to enter and emerge from the cloth on the same side of the presser foot and adjacent opposite sides of said cloth opening, a loop taker for the penetrant loop of the needle thread, a second-thread carrier, a bight looper, and means for moving said bight looper always on the same side of the presser foot to cast a bight of one of the threads from between its carrier and the work across the cloth opening to beyond the remote extreme of the penetration range of the needle, thereby to position said bight to be entered by the needle in forming a succeeding penetrant loop.

14. In a sewing machine of the character described, the combination of a presser foot having a cloth opening therein, means below said presser foot for feeding the goods and presenting it in said cloth opening in the presser foot, and above the presser foot stitch-forming means comprising a needle entering and emerging from the same side of the work, a loop taker coöperating with the needle, and a bight looper for the needle thread.

15. In a blind stitch sewing machine, the combination of a frame providing an arm, a head, stitch-forming mechanism comprising a reciprocable needle and complemental loop taking mechanism carried by said head, and means for connecting the head and arm permitting attachment of the head to the arm in various positions of rotary adjustment with respect to the stitch making point of the stitch-forming mechanism as an axis.

16. In a blind stitch sewing machine, a frame providing an arm, a head, stitch-forming mechanism carried by said head comprising a reciprocable needle and loop-taking mechanism, and means for connecting the head and arm in various positions of angular adjustment about the point of stitch formation as an axis, to vary the angle at which the needle approaches the stitch making point.

17. In a blind stitch sewing machine, a frame providing an arm having a lateral surface curved on a true arc, a head constructed to carry stitch-forming mechanism comprising a reciprocable needle and complemental loop taking means, adapted to form its stitches at the axis of said arc and head providing a complemental surface, and means for connecting said head and arm in various positions of angular adjustment.

18. In a blind stitch sewing machine, a frame providing an arm having a lateral surface curved on a true arc, a head constructed to carry stitch-forming mechanism, comprising a reciprocable needle and complemental loop taking means, adapted to form its stitches at the axis of said arc said head providing a complemental surface, and means for connecting the head to the arm for detachment and for change in the angular position about the axis of the head.

19. In a blind stitch sewing machine, means for presenting and feeding the work, a stitch-forming mechanism working on one side of the work and comprising a needle reciprocable diagonally to the feed-line to enter and emerge from the same face of the work at the stitch-making point, a head carrying said stitch-forming mechanism, an arm carrying said head, said head and arm having complemental curved surfaces concentric with said stitch-making point, and means for securing said head and arm together in different positions varying the angle of the needle-path to the feed.

20. In a blind stitch sewing machine, the combination with a frame providing an arm, a power shaft associated with the arm, a head, means to connect said head with the arm in various positions of angular adjustment about an axis including the stitch making point, a head shaft carried by said head, stitch-forming mechanism comprising a reciprocable needle and complemental loop taking means wholly carried by the head and driven by the head shaft, and driving connections from the power shaft to the head shaft.

21. In a blind stitch sewing machine, the combination of a stationary presser-foot having a work opening, means on one side of said presser-foot to present the work through said opening, stitch-forming mechanism on the other side of said presser-foot comprising a frame member, a yoke-shaped needle-bar pivoted in said frame member, a needle carried by said bar, a looper working between the limbs of said yoke, and means to operate the needle-bar and the looper.

22. In a blind stitch sewing machine, the combination of a stationary presser-foot having a work opening, means on one side of said presser-foot to present the work through said opening, stitch-forming mechanism on the other side of said presser-foot comprising a frame member, a yoke-shaped needle-bar horizontally pivoted in said frame member, a needle carried by said bar, a looper vertically working between the limbs of said yoke, and means to operate the needle-bar and the looper.

23. In a sewing machine, stitch forming mechanism comprising a frame member, a curved needle, and a needle bar of yoke-shape, pivoted at its yoke ends in the frame member, and having its yoke portion extending toward the needle, and carrying the needle adjacent to the middle of the yoke.

24. In a sewing machine for blind stitching, a stitch-forming mechanism comprising a power shaft, a needle, connections to drive said needle from said shaft, a vertical looper bar, a looper carried thereby, and means to impart six-way motion to said looper comprising a rock-shaft, means driven by said drive shaft to move said rock shaft faster in one direction than in the other, connections for imparting four movements from said rock-shaft to said looper bar, and connections for imparting the remaining two movements to said looper bar from said drive shaft.

25. In a sewing machine for blind-stitching, stitch-forming mechanism comprising, in combination, a drive shaft, a needle, operating connections for said needle to reciprocate it, a looper having a vibratory movement in the general direction of needle travel in time different from that of the needle, and means for imparting said movement to the looper from said drive shaft, said means including a rotating wrist member, a pivoted arm having sliding engagement with the wrist member to be oscillated thereby, and operating connections from said arm to the looper.

26. In a sewing machine, a stitch-forming mechanism, including a looper, and means to vibrate the looper comprising a rotating wrist member, an arm pivoted outside of the circle described by said wrist member receiving said wrist member in sliding engagement, whereby the arm receives movements in opposite directions during different quantities of time of rotation of the wrist member, and operating connections between said arm and the looper to vibrate said looper in timed relation to said movements of said arm.

27. In a sewing machine, a stitch-forming mechanism including a looper and means to vibrate the looper comprising a drive shaft, a rock-shaft, a pivoted arm, a wrist member rotating with the drive shaft having sliding connection with the pivoted arm to operate it, operating connections between said arm and the rock-shaft to rock the shaft as the arm vibrates, and operative connections between the rock-shaft and the looper to vibrate the latter.

28. In a sewing machine, a stitch-forming mechanism including a looper and means to vibrate the looper comprising a drive shaft, a rock-shaft, a pivoted arm, a wrist member rotating with the drive shaft having sliding connection with the pivoted arm to operate it, operating connections between said arm and the rock-shaft to rock the shaft as the arm vibrates, and a crank connection between the rock-shaft and said looper to impart four-way motion to said looper from said rock-shaft.

29. In a sewing machine, stitch-forming mechanism, including a reciprocating needle and a looper coacting therewith at two points in its travel, a main shaft, a rock-shaft to be operated by said main shaft, a crank on said rock-shaft imparting movements to the looper in the general direction of needle-travel, means driven by the main shaft for imparting other movements to the looper, and operating connections between said rock-shaft and said main shaft for causing the rocking of the rock-shaft in one direction to consume a greater time than its reverse movement.

30. In a sewing machine, stitch-forming mechanism comprising a needle, means to reciprocate it, a pivoted looper, and means to vibrate the looper about its pivot, moving it in the same general direction as the needle travel, but at different rates of speed on its opposite strokes.

31. In a sewing machine for blind stitching, stitch-forming mechanism including a reciprocating needle, a complemental rotary hook, a looper, and a bobbin case throw back operated by the looper mechanism.

32. In a sewing machine, stitch-forming mechanism including, in combination, a reciprocating needle, a rotary hook transverse to said needle, and a thread-guard on the rear face of said hook, said guard providing an otherwise-annular channel interrupted for a space adjacent the beak of the hook.

33. In a sewing machine, a stitch-forming mechanism including, in combination, a reciprocating needle, a rotary hook transverse to the needle path, said hook having a peripheral beak, and a thread-guard secured to the rear face of the hook consisting of an otherwise-annular channel member having a portion adjacent the hook formed into a needle-guard in register with the point of the hook.

34. In a sewing machine, stitch-forming mechanism including, in combination, a reciprocating needle, a rotary hook transverse to the needle path, said hook having a peripheral beak, and a thread-guard secured to the rear face of the hook and comprising a channeled thread-receiving portion and a needle-guard portion, the latter being in register with the point of the hook.

35. In a sewing machine, stitch-forming mechanism comprising a needle and coacting means for forming a series of keyed penetrant loops, in combination with a bight looper working in the general direction of needle-travel to throw a bight of thread from beyond one extreme of the penetrant range of the needle to beyond the other extreme of said range, and means to move said bight looper at different rates of speed on its opposite strokes.

36. In a sewing machine, a stitch-forming mechanism comprising a needle and coacting means for forming a series of keyed penetrant loops, in combination with a bight looper working in the general direction of needle-reciprocation to throw a bight of thread from beyond one extreme of the penetrant range of the needle to beyond the other extreme of such range, and means for moving said looper relatively rapidly on its thread-carrying excursion and relatively slowly on its return excursion.

37. In a blind stitch sewing machine, stitch-forming mechanism comprising a needle and coacting means, including a loop take-up for the needle thread, for forming a series of keyed penetrant loops; in combination with a bight looper and means for moving the same to take a bight of the needle thread from between a point of anchorage in the work and the source of thread supply and pass the bight to encompass a succeeding point of emergence of the needle, said means moving the bight looper rapidly on its thread-carrying excursion and more slowly on its return movement.

38. In a blind stitch sewing machine, stitch-forming mechanism comprising a needle, means to reciprocate it, and means coacting therewith to form a series of keyed penetrant loops; in combination with a bight looper working in the general direction of needle travel to throw a bight of thread from beyond one extreme of the penetrant range of the needle to beyond the other extreme of said range, and means, timed independently of the needle-reciprocating means, to move said looper at different rates of speed on its opposite strokes.

In testimony whereof I hereunto set my hand in the presence of two witnesses.

JOHN G. LEWIS.

In the presence of—
W. LINN ALLEN,
MARZ F. ALLEN.